(12) United States Patent
Kryskowski et al.

(10) Patent No.: US 8,158,943 B2
(45) Date of Patent: Apr. 17, 2012

(54) INFRARED DETECTOR

(75) Inventors: David Kryskowski, Ann Arbor, MI (US); Justin Renken, Ann Arbor, MI (US)

(73) Assignee: UD Holdings, LLC, Dearborn Heights, MI (US)

( * ) Notice: Subject to any disclaimer, the term of this patent is extended or adjusted under 35 U.S.C. 154(b) by 0 days.

(21) Appl. No.: 13/263,825

(22) PCT Filed: Mar. 23, 2010

(86) PCT No.: PCT/US2010/028293
§ 371 (c)(1),
(2), (4) Date: Nov. 7, 2011

(87) PCT Pub. No.: WO2010/120447
PCT Pub. Date: Oct. 21, 2010

(65) Prior Publication Data
US 2012/0043464 A1 Feb. 23, 2012

Related U.S. Application Data

(60) Provisional application No. 61/168,601, filed on Apr. 12, 2009.

(51) Int. Cl.
*G01J 5/10* (2006.01)
(52) U.S. Cl. .................................................. 250/338.1
(58) Field of Classification Search .................. 250/334, 250/338.1, 352
See application file for complete search history.

(56) References Cited

U.S. PATENT DOCUMENTS

| | | | |
|---|---|---|---|
| 4,772,790 | A | 9/1988 | Aldridge |
| 4,991,127 | A | 2/1991 | Crookshanks |
| 5,010,251 | A | 4/1991 | Grinberg et al. |
| 6,040,579 | A | 3/2000 | Munch et al. |
| 6,078,356 | A | 6/2000 | Jensen |
| 6,335,478 | B1 | 1/2002 | Chou et al. |
| 6,781,128 | B2 | 8/2004 | Hirota et al. |
| 6,812,465 | B2 | 11/2004 | Parrish et al. |
| 6,949,286 | B2 | 9/2005 | Nakajima et al. |
| 7,087,900 | B2 | 8/2006 | Iida et al. |
| 7,161,419 | B2 | 1/2007 | Tei et al. |
| 7,193,212 | B2 | 3/2007 | Hirota |
| 2004/0113076 | A1 | 6/2004 | Guo et al. |
| 2008/0216883 | A1 | 9/2008 | Leneke et al. |

OTHER PUBLICATIONS

Hirota et al., "120 90 element thermoelectric infrared focal plane array with precisely patterned Au-black absorber", Sensors and Actuators A, 135, (2007), pp. 146-151, Technology Research Laboratory No. 1, Nissan Research Center, Yokosuka, Japan.
Foote, "Progress Towards High-Performance Thermopile Imaging Arrays", SPIE, vol. 4369, 2001, pp. 350-354.

(Continued)

*Primary Examiner* — Mark R Gaworecki
(74) *Attorney, Agent, or Firm* — Brooks Kushman P.C.

(57) ABSTRACT

In at least one embodiment, an infrared (IR) detector for generating an image of an object is provided. The IR detector includes a plurality of thermal sensing elements that are arranged in an array of M columns and N rows. Each thermal sensing element is configured to receive at least one oscillating signal and detect at least a portion of a thermal output from the object. Each thermal sensing element is further configured to generate an electrical output signal that is indicative of at least a portion of detected thermal output and to modulate the electrical output signal with the at least one oscillating signal to generate a modulated output signal that is indicative of at least a portion of the image of the object.

20 Claims, 7 Drawing Sheets

OTHER PUBLICATIONS

Foote et al., "Thermopile Detector Arrays for Space Science Applications", Jet Propulsion Laboratory, Pasadena, CA, 2004.
Gaalema et al., "Thermopile detector radiation hard readout", downloaded from SPIE Digital Library on Sep. 2, 2011, SPIE, vol. 7780, 7 pages.
Tissot et al., "Uncooled microbolometer detector: recent developments at ULIS", Opto-Electronics Review, 14, No. 1, 2006, pp. 25-32.
Takahata, Akihiro et al., "Infrared Position Sensitive Detector (IRPSD)," 6940-99 V. 1, Feb. 19, 2008, pp. 1-11.
Charlot, B. et al., "A Self-testable CMOS Thermopile-based Infrared Imager," downloaded from SPIE Digital Library in 2001, Proc. SPIE vol. 4408, pp. 96-103.
International Search Report and Written Opinion for PCT/US2010/028293 dated May 12, 2010, 9 pages.
IPER for PCT/US10/28293 dated Aug. 2, 2011, 16 pages.

INFRARED DETECTOR

CROSS-REFERENCE TO RELATED APPLICATIONS

This application is the U.S. national phase of PCT application Ser. No. PCT/US10/028293 filed Mar. 23, 2010 which claims the benefit of U.S. provisional application Ser. No. 61/168,601 filed on Apr. 12, 2009, the disclosures of which are hereby incorporated by reference in their entirety.

BACKGROUND

1. Technical Field

The embodiments of the present invention generally relate to, among other things, an infrared (IR) detector.

2. Background Art

An IR detector is generally defined as a photodetector that responds to IR radiation. One type of an infrared detector is a thermal based detector. A thermal based detector may be implemented within a camera to generate an image of an object formed on the thermal properties generally associated with such an object. Thermal based detectors are known to include bolometers, microbolometers, pyroelectric, and thermopiles.

A microbolometer changes its electrical resistance based on an amount of radiant energy that is received from an object. Thermopiles include a number of thermocouples that convert thermal energy from the object into electrical energy. Such devices have been incorporated into cameras in one form or another for thermal imaging purposes.

SUMMARY

In at least one embodiment, an infrared (IR) detector for generating an image of an object is provided. The IR detector includes a plurality of thermal sensing elements that are arranged in an array of M columns and N rows. Each thermal sensing element is configured to receive at least one oscillating signal and detect at least a portion of a thermal output from the object. Each thermal sensing element is further configured to generate an electrical output signal that is indicative of at least a portion of detected thermal output and to modulate the electrical output signal with the at least one oscillating signal to generate a modulated output signal that is indicative of at least a portion of the image of the object.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the one or more embodiments of the present invention.

Various embodiments of the present invention generally provide for, but not limited to, an IR detector that includes a thermal sensing device based array. The array includes a plurality of thermal sensing elements that each include a thermopile (or other suitable thermal sensing device) distributed into M columns and N rows (e.g., M×N thermopile array). A function generator (or other suitable device that is situated to generate an oscillating signal at a corresponding frequency) may drive each column (or row) of thermal sensing elements (to modulate an output of each thermopile) within the array with oscillating signals at a different frequency from one another such that an electrical output is provided for each column (or row). The modulated electrical output from each thermopile in the column (or row) may be provided on a single modulated electrical output and is amplified by an amplifier (or other suitable device) for the given column (or row). A demodulation circuit may receive each single modulated electrical output after amplification for each column (or row) and demodulate the amplified output (e.g., remove constant value from oscillating signal(s) for each column (or row)) to generate a constant electrical value. The constant electrical value may be indicative of a portion of the entire the detected image. The entire detected image can be reconstructed by assembling all of the constant electrical values that are read from each column (or row) within the array.

It is contemplated that the embodiments described herein may be utilized for purposes other than those described and that the challenges that may be noted herein are not intended to be an exhaustive list of challenges that may be overcome by the embodiments of the present invention. Such challenges that may be described herein are noted for illustrative purposes and that all of the challenges that may be overcome by the various embodiments of the present invention are not described for purposes of brevity. Moreover, it is contemplated that the embodiments described herein may provide for any number of advantages and that those noted are not intended to be an exhaustive list that may be achieved. Such advantages disclosed herein are noted for illustrative purposes and that all of the advantages achieved by the embodiments of the present invention are not described for purposes of brevity as well. Furthermore, the examples provided herein are disclosed for illustrative purposes and are not intended to be an exhaustive list of examples that are capable of being implemented and are not intended to limit the scope of the embodiments of the present invention in any manner.

The embodiments of the present invention as set forth in FIGS. 3-8 generally illustrate and describe a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired in the camera. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to generate the oscillating signals to perform analog-to-digital conversion of array outputs and to demodulate the array outputs.

Figure 1:
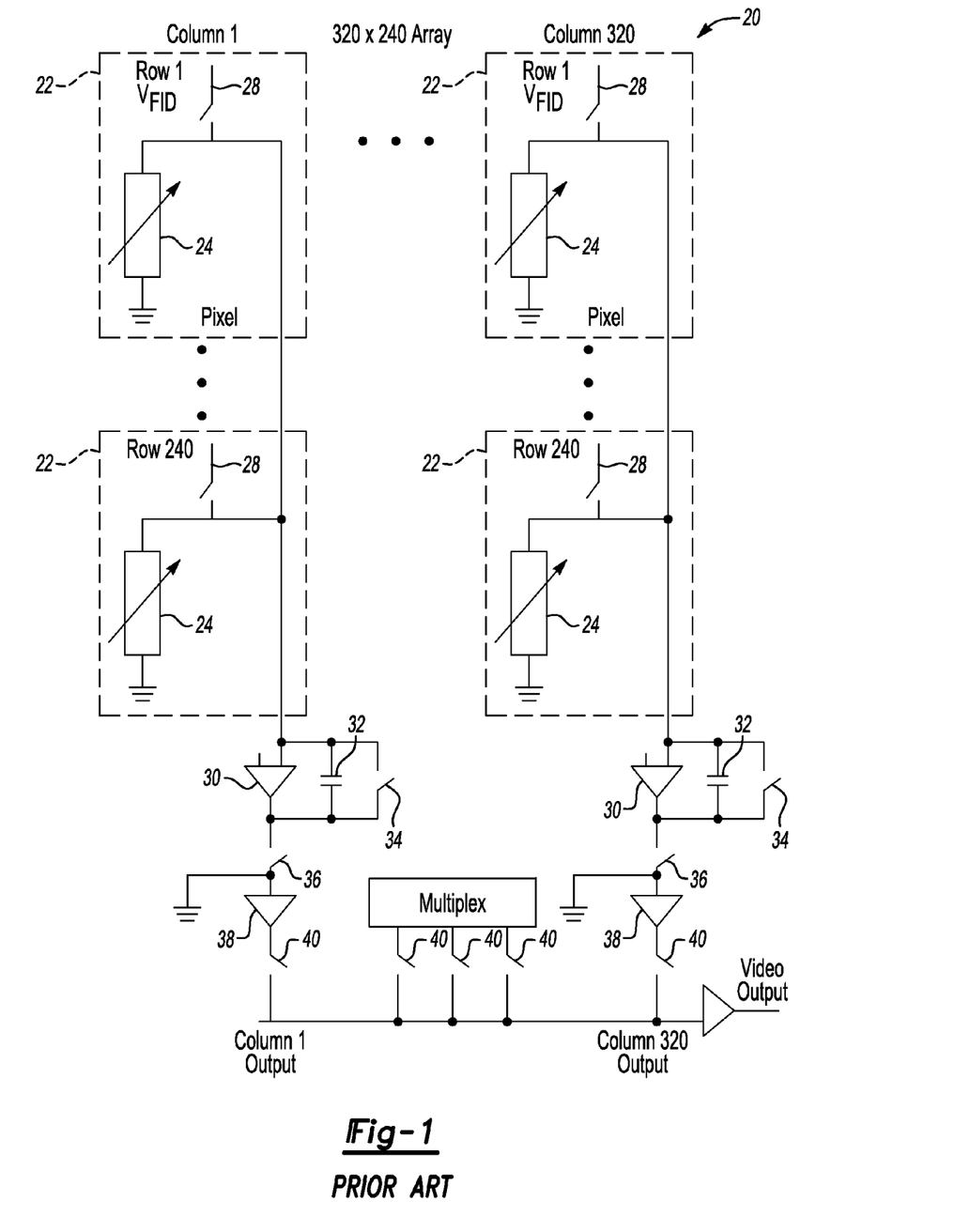
FIG. 1 depicts a conventional microbolometer based detector.

FIG. 1 depicts a conventional microbolometer based detector 20. The detector 20 may be implemented within a camera. The detector 20 may comprise a plurality of pixels 22 that are arranged in 320×240 array (e.g., 320 columns and 240 rows). Each pixel 22 includes a microbolometer 24, and a switch 28. The switch 28 may be implemented as a field effect transistor (FET). It is known that the microbolometers 24 and the switches 28, are formed on a semiconductor substrate. The detector 20 may be implemented with a pixel pitch of 45 um using a 3.3V 0.5 um Complementary Metal-Oxide Semiconductor (CMOS) technology.

A selectable DC based power supply (not shown) closes the switches 28 in sequence, row by row (e.g., all switches in a row are closed at the same time while all other switches in different rows are open) so that current from one microbolometer 24 in a column flows therefrom. The condition of measuring a single bolometer in a time slice that is 1/N (where N corresponds to the number of rows) before the cycle repeats is generally defined as time division multiplexing (TDM).

A capacitive trans-impedance amplifier (CTIA) 30 is coupled to the output of each pixel 22 for a given column. A capacitor 32 is coupled to each CTIA 30. The size of the capacitor 32 controls the gain of the CTIA 30 output. Each CTIA 30 performs a current-voltage conversion by integrating a charge on the capacitor 32. A switch 34 may serve to reset the current to voltage conversion performed by the CTIA 30.

A switch 36 and capacitor 42 are coupled to an output of the CTIA 30 to perform a sample and hold (S&H) operation for a given column. When the proper amount of charge is integrated across the capacitor 32, the switch 36 closes momentarily to transfer the charge to the capacitor 42. The purpose of S&H operation is to hold the charge collected from the capacitor 32 to await digitization.

An additional amplifier 38 and switch 40 is provided so that the output from each column can be read. The switch 40 can be configured to close to enable the output for corresponding column to pass through a multiplexer. Once the output for a given column is ascertained, the switches 28 and 40 are opened and the switches 28 and 40 for a preceding row are closed so that a reading for such a row can be ascertained. This sequence occurs one at time for every row within the array. As noted above, the detector 20 employs a TDM approach such that the FET switch 28 for a given row is closed one at a time so that the corresponding output for the given row is ascertained. The outputs for each column are transmitted on a signal VIDEO_OUTPUT to an Analog to Digital (A/D) converter (not shown). The detector 20 as used in connection with the TDM approach may exhibit noise aliasing. Noise aliasing may change the shape of the noise spectrum (e.g., noise exhibits non-linear patterns) and become less predictable. As such, if one cannot predict the noise, then design options may be not able to be used that may otherwise eliminate the effects of such predictable noise to increase camera performance.

Figure 2:
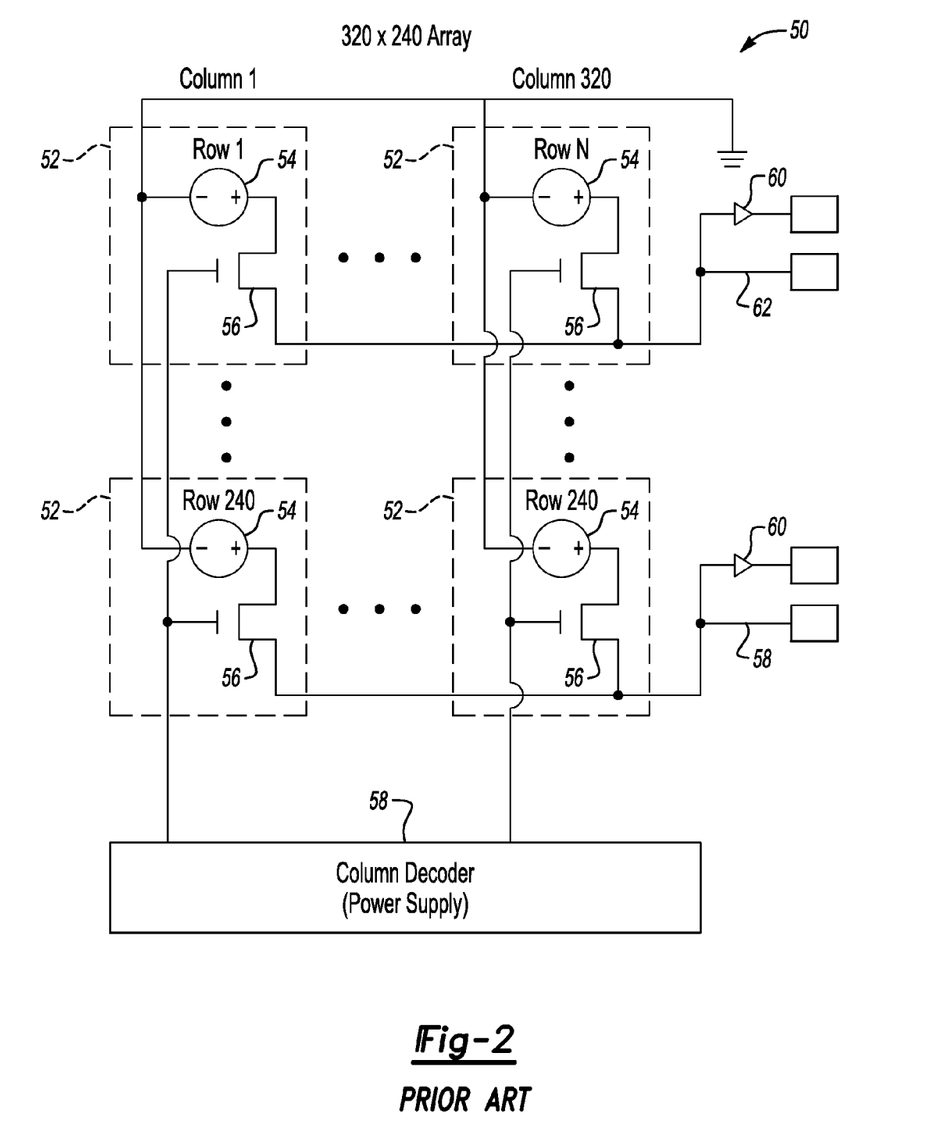
FIG. 2 depicts a conventional thermopile based detector.

FIG. 2 depicts a conventional thermopile based detector 50. The detector 50 may be implemented within a camera. The detector 50 is generally packaged, mounted on a circuit board and enclosed by a cap in which a lens is arranged. The detector 50 includes a plurality of pixels 52 that may be arranged in 320×240 array (e.g., 320 columns and 240 rows). Each pixel 52 includes a thermopile sensor element 54 and a switch 56. The switch 56 is implemented as a FET.

A column decoder 58 is provided and includes a DC power supply that selectively closes the switches 56 on a column wise bases, one column at a time (i.e., the detector 50 employs a TDM scheme). Each thermopile 54 in the corresponding column generates an output voltage in response to the switch 56 being closed. A low noise amplifier 60 is operably coupled to each thermopile 54 in a given row. The amplifier 60 is generally configured to provide a higher output gain than that of the amplifier used in connection with the detector 20 (e.g., the microbolometer based detector). A representative amplifier that may be used for increasing the gain from the thermopiles 54 is an LT6014 that is provided by Linear Technology of 1630 McCarthy Blvd., Milpitas, Calif. 95035-7417. A lead 62 is provided for distributing the output voltage from the thermopile 54 to a device that is not included within the detector 50. The amplifier 56 increases the output voltage provided from the thermopile 54.

In general, after each thermopile 54 within a given column is enabled by a corresponding FET switch 56, each amplifier 60 that is coupled to the thermopile 54 requires a settling time. After such a settling time is achieved, the voltage output provided by the thermopile 54 is digitized so that the image can be rendered as an electronic image.

It is known that thermopiles generally have a good signal-to-noise ratio. It is also known that thermopiles generally exhibit a low response and low noise. In order to increase the response, the low noise amplifier 60 may be needed to increase the gain for a particular row of pixels 52. However, the use of such low noise amplifiers may still add a significant amount of noise in the detector 50 readout. Particularly, for amplifiers that are incorporated on the same silicon substrate as the detector 50. The detector 50 may also experience noise aliasing. As noted above, such a condition may reduce the ability to predict noise. If the noise cannot be predicted, then it may not be possible to implement design options that may mitigate the effects of predictable noise patterns.

Figure 3:
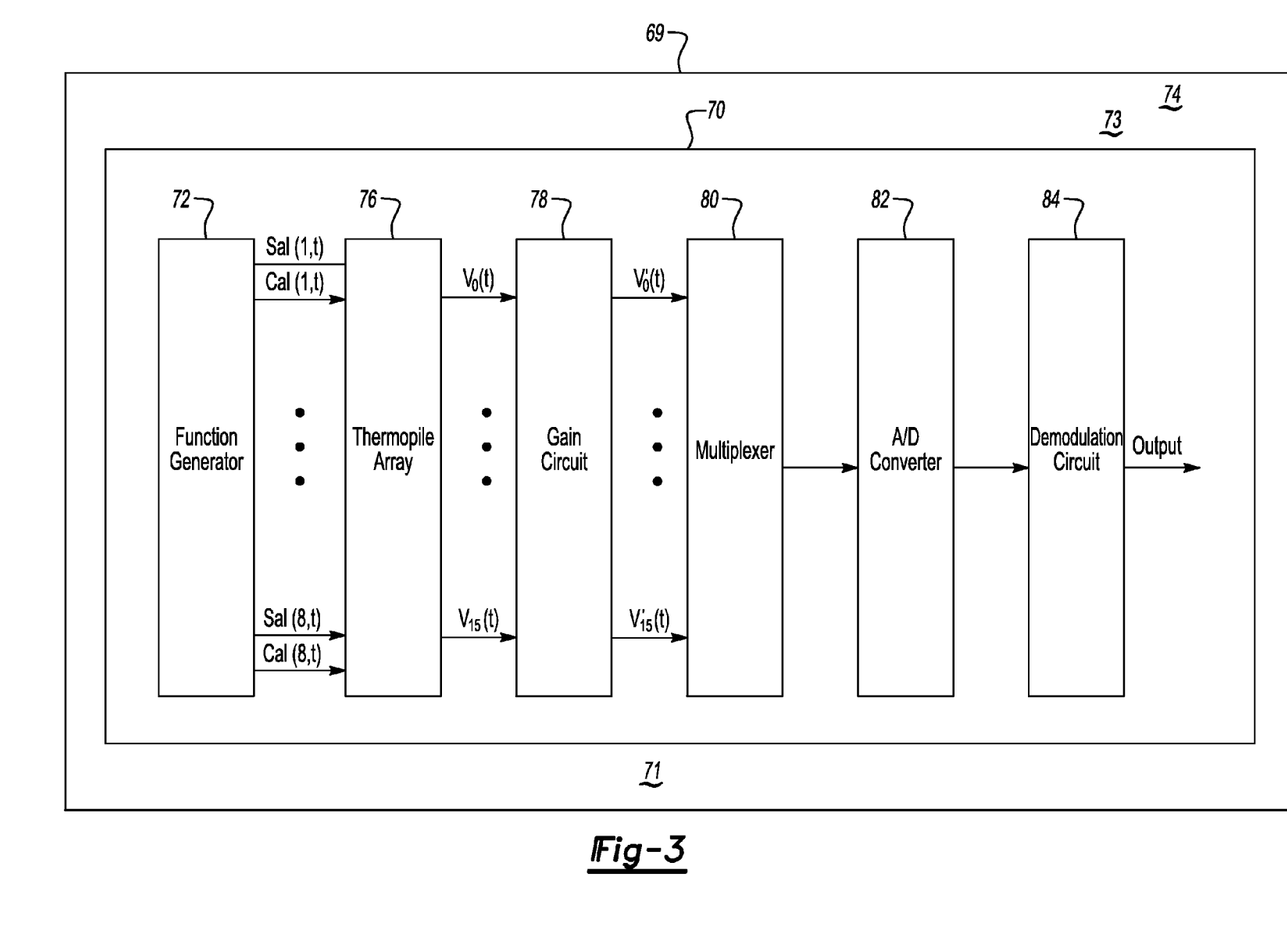
FIG. 3 depicts an IR detector in accordance to one embodiment of the present invention.

FIG. 3 depicts a thermopile IR detector 70 in accordance to one embodiment of the present invention. The detector 70 may be implemented within an imaging device 69 such as, but not limited to, a camera. The detector 70 is generally put into a package and mounted on a circuit board 71. The detector 70 and the circuit board 71 are enclosed by a cap 73 in which a lens 74 is arranged. The detector 70 generally comprises a function generator 72 and a thermopile array 76. The function generator 72 may drive each column (or row) of the thermopiles at the same time with an oscillating carrier (or oscillating signal). Each thermopile generates an electrical output in response to the thermal energy captured from the object. The corresponding electrical output that is generated by the thermopile is amplitude modulated with the oscillating carrier signal and transmitted therefrom. Each column (or row) of thermopiles is driven at a unique frequency from one another.

In general, the function generator 72 is configured to activate all of the thermopiles in all of the columns (or rows) to amplitude modulate the output from each thermopile (e.g., through the use of one or more switches that may be coupled to each thermopile) with the oscillating carrier which is at a unique frequency for each column (or row). All of the thermopiles may be active at the same time. A gain circuit 78 that includes a plurality of amplifiers is operably coupled to the thermopile array 76. Each amplifier is coupled to a particular column (or row) of thermopiles to increase the signal strength for each column (or row) of thermopiles. A demodulation circuit 84 is generally coupled to the gain circuit 78 and is configured to separate the orthogonal carriers for each column (or row) of thermopiles so that the corresponding voltage output from each column of thermopiles can be ascertained in order to generate an electronic image of the captured original image. It is contemplated that the embodiments of the present invention may utilize frequency modulation or phase modulation.

The concept of modulating all of the thermopiles for all columns (or rows) with an oscillating carrier at a unique frequency for each column in which all of the carriers are simultaneously presented to each column (or row) and modulated within an array is generally defined as a Frequency Division Multiplexing (FDM) approach. The FDM approach enables the use of a dedicated amplifier to be added to every row in the thermopile array 76 to increase the signal strength irrespective of the amount of noise generated by such amplifier. For example, a natural consequence of amplitude modulating each of the thermopiles for a given column (or row) with a unique carrier signal at a predetermined frequency and then simultaneously presenting such signals to the amplifiers with the gain circuit 78 is that the broadband noise of the channel becomes large (e.g., a standard deviation of the broadband noise grows by the square root of the number of thermopiles on the column (or row)). If the broadband channel noise is "large" compared to the broadband amplifier noise, the broadband noise created by the amplifier on the given column (or row) becomes insignificant due to the fact that the broadband noise for both the channel and the amplifier adds up as a quadrature sum (e.g., square root of the sum of squares of the noise standard deviations) so the amount of noise introduced by the electronics is considered to be inconsequential.

It is also contemplated that the materials used to construct the thermopiles in the array 76 may comprise compounds in the $(Bi_{1-x}Sb_x)_2 (Te_{1-y}Se_y)_3$ family (e.g., Bismuth—Tellurium family). The family of compounds will be denoted by $Bi_2Te_3$ for brevity. The use of $Bi_2Te_3$ to construct the thermopiles in the array 76 may cause the thermopile resistance to fall below 10 K Ohms, which can cause a decrease in the amount of thermopile (or detector) noise. While $Bi_2Te_3$ based materials can be used to construct thermopiles for the TDM approach to reduce thermopile noise, such a reduction in noise may be minimized when compared to the amount of noise created by the amplifier (e.g., see amplifier 60 in FIG. 2). The large amount of noise created by the amplifier may be mitigated due in large part to the implementation of the FDM approach for the reasons noted above.

In general, the use of $Bi_2Te_3$ may produce a very high performance thermopile based detector if the amplifier was ideal with no noise. Because the impedance (or resistance) of a $Bi_2Te_3$ based thermopile is so low, its noise is also low. To read out a low impedance thermopile and not add any noise to the output signal may require a very low noise amplifier. This may be an issue with the TDM approach as it may be necessary to read out a high performance thermopile with a very high performance amplifier. High performance may mean high power because the noise from the amplifier is reduced the more power the input stage of the amplifier consumes. On the other hand, the FDM approach may incorporate low impedance (e.g., high performance) thermopiles that are in series (see FIG. 5) to increase the overall noise presented to the amplifier. Since the total noise standard deviation is computed by the square root of the sum of the squares of the thermopile standard deviation (all in parallel or series (see FIGS. 5 and 7)) and the amplifier standard deviation, the total noise may be primarily dominated by the noise from the thermopiles. While the overall signal before demodulation may be noisy, such a noisy signal may be averaged (e.g., by integrating) over a much longer time (e.g., the image frame rate time). Because the overall signal can be integrated over this longer period of time, the signal can be built back to the noise ratio of a single thermopile detector close to its original value after demodulation and the influence of the amplifier noise can be shown to nearly vanish. This condition may illustrate the notion of predicting the noise and using measures within the design to eliminate its effects.

The following illustrates the manner in which the FDM approach may reduce the electronic noise in comparison to the TDM approach. In particular, the signal to noise (SNR) ratio will be computed for the TDM approach and the FDM approach. The signal from a $i^{th}$ detector (thermopile) under TDM can be written as:

$$r_i(t) = v_{si} + n_d(t) + n_e(t) \tag{1}$$

where:

$r_i(t)$ = Received signal from $i_{th}$ detector $v_{si}$ = Signal voltage from $i_{th}$ detector (V)

$n_d(t)$ = zero-mean white Gaussian detector noise with spectral height $$*_{v_d}^2\left(\frac{V^2}{Hz}\right)$$

$n_e(t)$ = zero-mean white Gaussian electronics noise with spectral height $$*_{v_e}^2\left(\frac{V^2}{Hz}\right)$$

$E[n_d(t)n_e(t)] = 0$ $E[\bullet]$ = statistical expectation $Var[\bullet]$ = statistical variance In the TDM approach, the detector is sampled for a fraction of the frame time, $T_{frame}$. The fraction of time is determined based on the number of detectors in a row that need to be multiplexed out, $N_{column}$. The output of a standard integrator is:

$$V_{TDM} = \int_0^{\frac{T_{frame}}{N_{column}}} r_i(t) dt \tag{2}$$

The SNR is given by the following equation:

$$SNR_{TDM}^2 = \frac{\int_0^{T_{frame}} \frac{E[r_i(t)]^2}{N_{column}} dt}{\text{Var}[V_{TDM}]} \quad (3)$$

The SNR for TDM can now be evaluated:

$$SNR_{TDM}^2 = \frac{v_{s_i}^2 \cdot T_{frame}}{N_{column}(v_d^2 + v_e^2)} \quad (4)$$

For the FDM approach, each detector is modulated on a unique orthogonal carrier, $s_i(t)$. It will be shown later that for the FDM approach, all of the detectors are present all the time on the row bus. The consequence of this is that the noise variance of each detector are added together. The signal on the row bus becomes:

$$r(t) = \sum_{i=1}^{N_{columns}} [v_{s_i} s_i(t)] + n_d(t) + n_e(t) \quad (5)$$

where:
r(t)=Received signal
$s_i$(t)=Orthogonal carrier i
$v_{s_i}$=Thermopile signal or orthogonal carrier i (V)
n'$_d$(t)=zero-mean white Gaussian detector noise with spectral height $N_{columns}$ $$N_{columns} \cdot v_d^2 \left(\frac{V^2}{Hz}\right)$$

n'$_e$(t)=zero-mean white Gaussian electronics noise with spectral height $$v_e^2 \left(\frac{V^2}{Hz}\right)$$

$E[n'_d(t)n'_e(t)]=0$
and $$\begin{cases} \int_0^{T_{frame}} s_i(t)s_j(t)dt = T_{frame} & \text{for } i=j \\ \int_0^{T_{frame}} s_i(t)s_j(t)dt = 0 & \text{for } i \neq j \end{cases} \quad (6)$$

In FDM approach, the detector is sampled for the full frame time, $T_{frame}$ because all the detectors are on all the time. The output of a standard integrator is:

$$V_{FDM} = \int_0^{T_{frame}} r(t)s_i(t)dt \quad (7)$$

The SNR for FDM can now be evaluated for the $i^{th}$ component:

$$\begin{cases} SNR_{FDM}^2 = \dfrac{\int_0^{T_{frame}} E[r_i(t)]^2 dt}{\text{Var}[V_{FDM}]} \\ = \dfrac{v_{s_i}^2 \cdot T_{frame}}{(N_{column} v_d^2 + v_e^2)} \\ = \dfrac{v_{s_i}^2 \cdot T_{frame}}{N_{column}\left(v_d^2 + \dfrac{v_e^2}{N_{column}}\right)} \end{cases} \quad (8)$$

Comparing Equation 8 to Equation 4, it can be seen that with the FDM approach, the electronic noise variance decreases based on the number of detectors that are multiplexed out (e.g., $N_{column}$).

In general, it is recognized that the oscillating carriers may include any orthogonal set of functions such as, but not limited to, Walsh Functions, sine and cosine functions.

The Walsh functions as used herein may be denoted by wal(0, θ), sal(i, θ) and cal(i, θ) (where θ is normalized time t/T). Walsh functions may generally form a complete system of orthonormal functions, which may be similar to the system of sine and cosine functions. There is a close connection between sal and sine functions, as well as between cal and cosine functions. In general, Walsh functions are known to form a complete orthonormal set and are therefore orthogonal.

Figure 4:
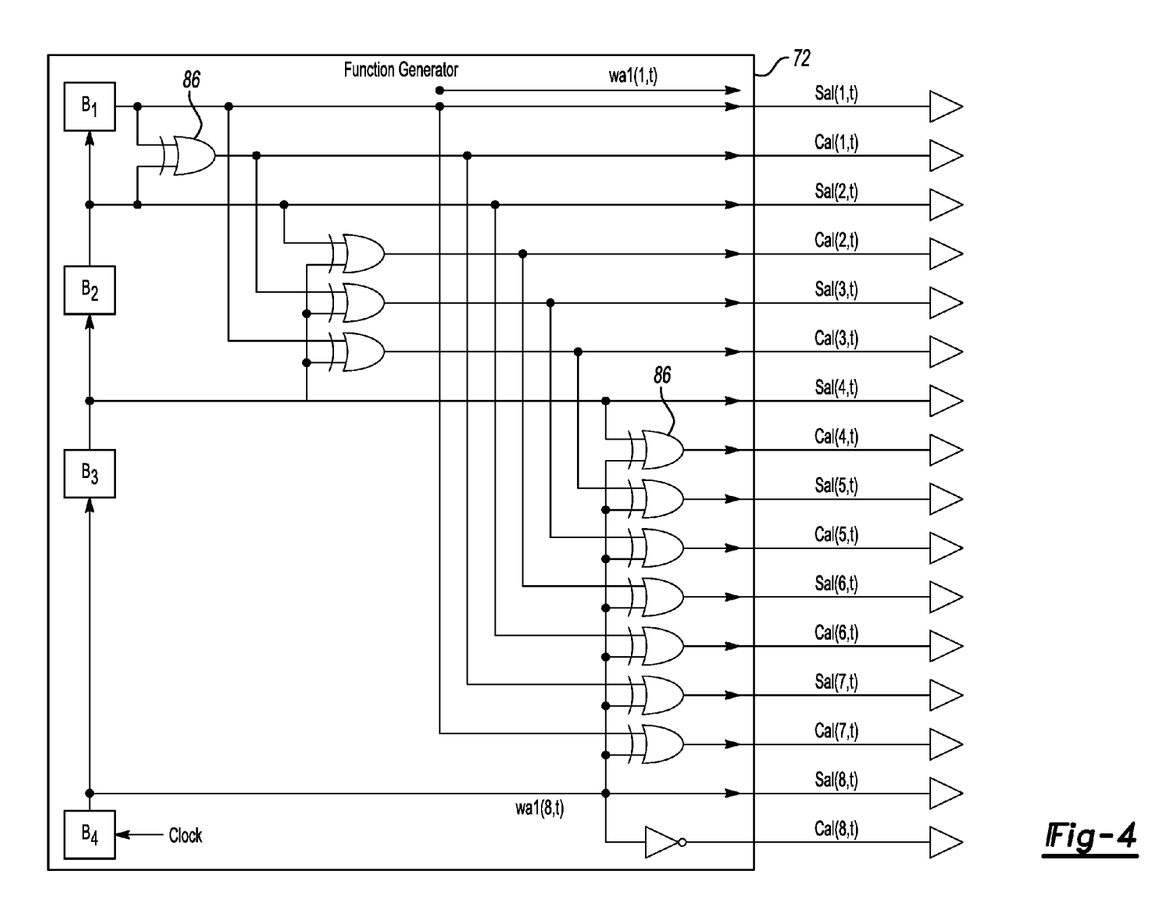
FIG. 4 depicts a function generator implemented within the IR detector of FIG. 3 in accordance to one embodiment of the present invention.

FIG. 4 depicts a function generator 72 implemented within the detector 70 of FIG. 3 in accordance to one embodiment of the present invention. The function generator 72 is configured to generate Walsh functions such as sal(x, t) and cal(y, t). For example, the function generator 72 generates the functions sal(1, t) through sal(8, t) and cal(1, t) through cal(8, t). In one example, the function generator 72 may be a 4-bit synchronous counter. It is recognized that the function generator 72 may be configured to accommodate for any number of bits and that the number of bits selected generally depends on the size (e.g., number of columns and/or rows) of the thermopile array. In addition, it is further recognized that the function generator 72 may be non-synchronous.

The function generator 72 includes a plurality of exclusive-or (XOR) gates 86 for receiving one or more bits (e.g., 4 bits) to generate the functions sal(1, t)-sal(8, t) and the functions cal(1, t)-cal (7, t) In general, the arrangement of the XOR gates 86 and the clock are configured such that each function of sal (x, t) and cal (y, t) is transmitted at a different period from one another so that a predetermined frequency is maintained between each function of sal(x, t) and cal(y, t). Each function of sal(x,t) and cal(y,t) is transmitted to a different column within the array 76. For example, sal(1,t) and cal(1,t) may be transmitted to a first column of thermopiles within the array and so on, in which sal(8,t) and cal(8,t) are transmitted to an eight column within the array 76. Because each function of sal (x, t) and cal (y, t) is transmitted at a different period from one another to maintain a predetermined frequency therebetween, such a condition may ensure that every column of thermopiles are modulated by the orthogonal set (e.g., of sal and/or cal functions) at a unique frequency.

Figure 5:
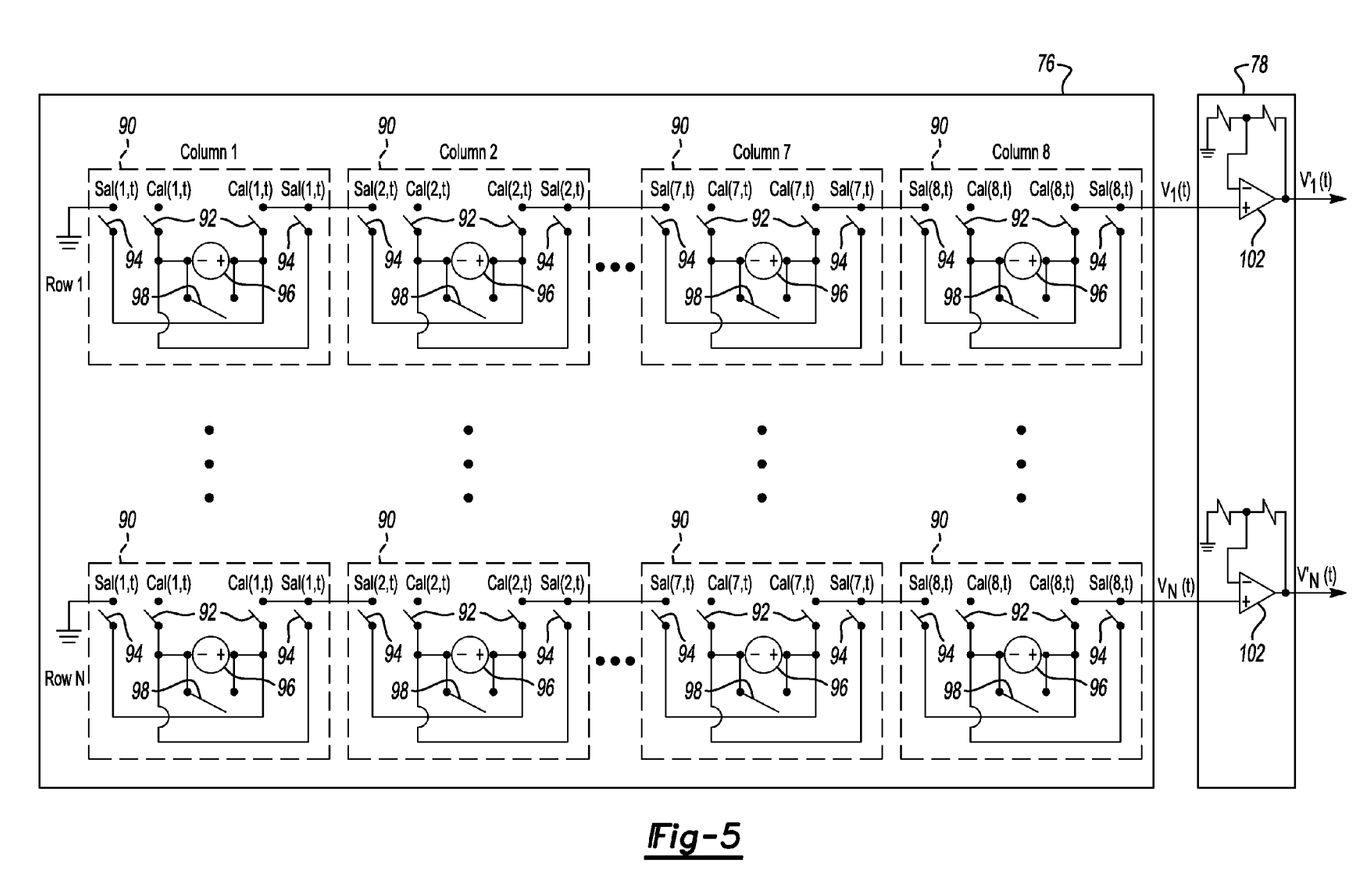
FIG. 5 depicts a thermopile array implemented within the IR detector of FIG. 3 in accordance to one embodiment of the present invention.

FIG. 5 depicts the thermopile array 76 implemented within the detector 70 of FIG. 3 in accordance to one embodiment of the present invention. The array 76 includes a plurality of pixels 90 (or thermal sensing elements) that are arranged in a 8×N array. For example, the array 76 includes 8 columns of pixels 90 and any number of rows of pixels 90. Each pixel 90 includes a first pair of switches 92, a second pair of switches 94, a thermopile 96, and a switch 98. It is recognized that the quantity of switches and thermopiles within each pixel may vary based on the desired criteria of a particular implementation. The switches 92 and 94 may coact with the thermopile to modulate the output of thermopile onto the oscillating signals. The columns of pixels 90 are configured to receive the functions sal(1,t)-sal(8, t); and cal(1, t)-cal(8, t) from the function generator 72. For example, pixel 90 in column 1 receives the function sal(1, t) and cal(1,t); pixel 90 in column 2 receives the functions sal(2,t) and cal(2, t) and so on such that the pixel in column 8 receives the functions sal(8,t) and cal(8,t).

It is recognized that the size of the array may vary and that the number of columns and rows may be selected based on the desired criteria of a particular implementation. It is also recognized that the number and configuration of switches 92, 94 may vary based on the desired criteria of a particular implementation. The use of such functions may vary as well based on the desired criteria of a particular implementation. The circuit as depicted within the array 76 (or elsewhere in the detector 70) is used for illustrative purposes and is not intended to demonstrate that the embodiments of the present invention are to be implemented in this manner alone.

As noted above, each function of sal (x, t) and cal (y, t) is transmitted at a unique frequency to each corresponding column of pixels 90 (e.g., column 1 receives sal(1, t) and cal(1,t) at a first frequency, column 2 receives sal(2,t) and cal(2,t) at a second frequency, column 3 receives sal(3,t) and cal(3,t) at a third frequency and so on). Each unique frequency may be separated by a predetermined amount to ensure that an output signal from each pixel 90 can be uniquely recovered during demodulation. In one example, the separation frequency may be 30 Hz.

In general, each column of pixels 90 is driven with the functions sal (x, t) and cal (y, t) and operate at a unique frequency from one another such that a voltage output from each thermopile 96 is read out on a row-wise basis. While each thermopile 96 may be a particular function of sal (x,t) or cal (y,t), half of the thermopiles 96 on a corresponding row may be in forward direction (+ side on row bus) and the other half of the thermopiles 96 may be in the reverse direction (− side on row bus) due to the cyclical nature of the orthogonal carriers (e.g. sal (x,t) and cal (y,t)). It is recognized that the voltage output from a given row is usually near ground because half of the thermopiles 96 may be in the forward direction while the remaining half of the thermopiles 96 are in the reverse direction. The overall dynamic range (e.g., the ratio of the highest measurable signal to the lowest measurable signal) is maintained. Each pixel 90 receives a sal(x,t) and cal(y,t) function because such functions provide non-overlapping clocks for suitable switching within each pixel 90.

The array 76 transmits the voltage output for each row on the signal $v_1(t)$ through $v_n(t)$ (where N=the number of rows in the array). A gain circuit 78 includes a plurality of amplifiers 102 that receives the voltage outputs $v_1(t)$-$v_n(t)$ and increases the amplitude for such to generate the voltage outputs $v_1'(t)$-$v_n'(t)$. In one example, each amplifier 102 may be a CMOS amplifier similar to LMC6022 from National Semiconductor of 2900 Semiconductor Drive, Santa Clara, Calif. 95052. Each amplifier 102 may be integrated on the same silicon substrate as the array 76. It is recognized that the type of amplifier used may vary based on the desired criteria of a particular implementation. As noted above in connection with FIG. 2, thermopiles generally exhibit a low response and require additional gain to increase the output. The thermopiles 96 are connected in series with one another in a given row and the corresponding voltage output is presented to the non-inverting input of the amplifier 102. Due to such an arrangement, the switch 98 is added across each thermopile 96 to permanently close its corresponding pixel in the event the thermopile 96 is damaged. The coupling of the thermopiles 96 in series in a particular row and the presentation of the voltage output form that row to the non-inverting input of the amplifier 102 increases the gain voltage output and reduces the potential for 1/f noise because of the small current flow into the non-inverting input of the amplifier 102.

A multiplexer 80 receives the output voltages $v_1'(t)$-$v_n'(t)$ from the gain circuit 80. An analog to digital (A/D) converter 82 receives an output voltage $v_1'(t)$-$v_n'(t)$ over a single wire bus. The A/D converter 82 converts the output voltage $v_1'(t)$-$v_n'(t)$ from an analog voltage signal into a digital voltage signal. The A/D converter 82 may include any combination of hardware and software that enables analog to digital conversion.

The demodulation circuit 84 is configured to receive a digital output from the A/D converter 82 for each row in the array 76. The demodulation circuit 84 may be a matched filter, a Fast Walsh Transform or any other suitable circuit that includes any combination of hardware and software to determine the voltage output for a given row of thermopiles 96 in the array 76. The output from the A/D converter 82 comprises a digital representation of the output voltage from a row of thermopiles 96 that is in the form of a constant that is multiplied to the corresponding orthogonal carriers (e.g., functions sal (x,t) and cal (y,t) that are transmitted at the unique frequency for each column).

Each of the unique orthogonal carriers includes the thermopile signal information. Multiplying the received signal by sal(i, t) (or cal(i, t)—if cal (i, t) is used, only a sign change will occur) performs the demodulation. The demodulated signal is then averaged to estimate the thermopile signal. The received signal from a row is given by Equation 9:

$$r(t) = \sum_{i=1}^{N_{column}} [m(t)sal(i,t)] + v_n(t) \quad (9)$$

Depending on the scene and thermal time constant, m(t) can be considered to be either a constant or a random variable to be estimated. Assuming that the parameter to be estimated is a constant, the optimal estimator is given by:

$$\hat{m}_i = \frac{1}{T_{frame}} \int_0^{T_{frame}} r(t)sal(i,t)dt \quad (10)$$

where:
$\hat{m}_i$=Estimated thermopile output signal from the $i^{th}$ detector
Since sal(i, t) is either +1 or −1 implementation in a digital signal processor (DSP) or field-programmable gate array (FPGA) may be simple.

Figure 6:
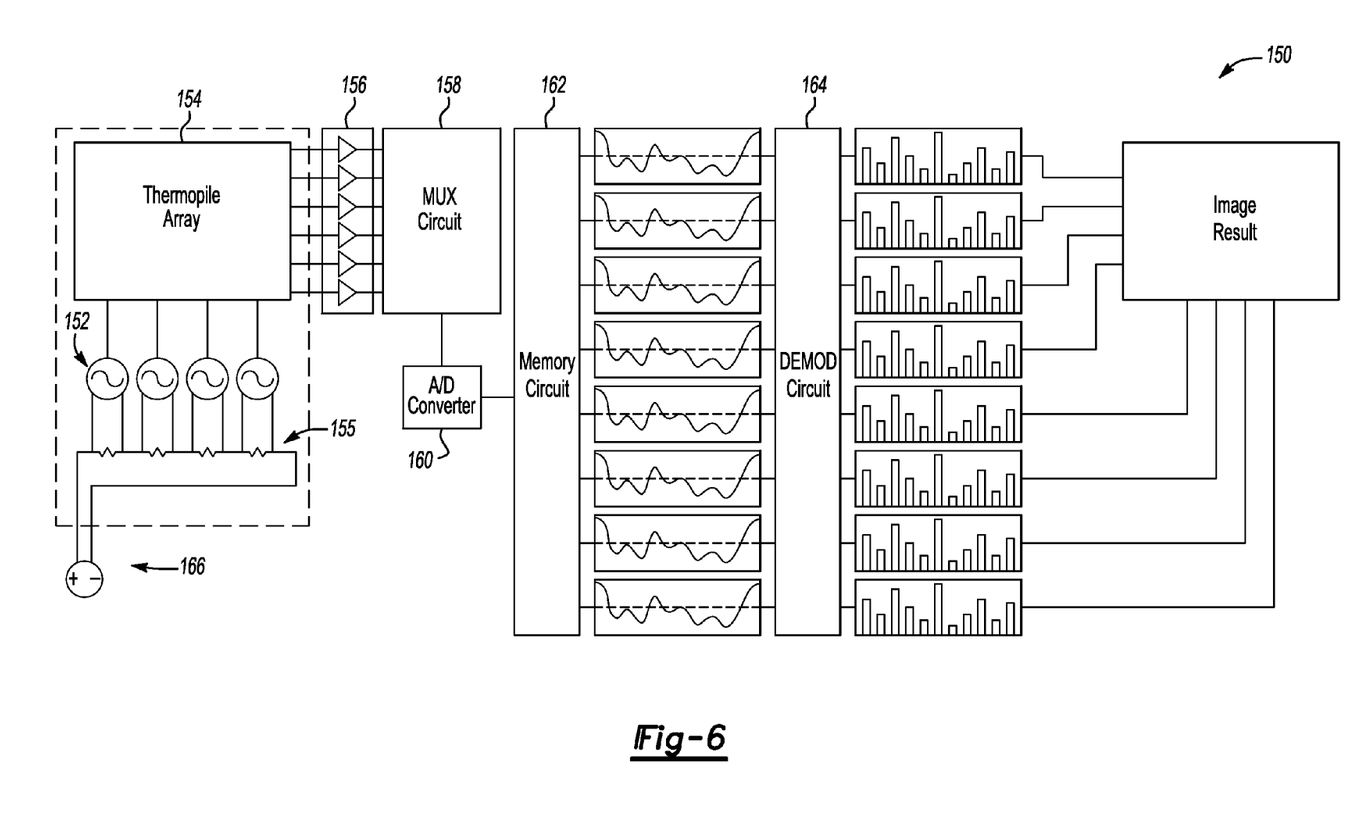
FIG. 6 depicts another IR detector in accordance to one embodiment of the present invention.

FIG. 6 depicts a thermopile IR detector 150 in accordance to another embodiment of the present invention. The detector 150 includes a plurality of oscillators 152 (or function generator), an array 154, a gain circuit 156, a multiplexer circuit 158, an A/D converter 160, a memory circuit 162, and a demodulation circuit 164. The plurality of oscillators 72 is configured to generate oscillating carrier signals at a predetermined frequency for activating all thermopiles within a given column (or row) so that modulated signals are transmitted therefrom. For example, each oscillator 72 is configured to generate an oscillating signal at a unique frequency and to transmit the same to a corresponding column of pixels within the array 154. Each of the columns of pixels is driven at the same time but at different frequency from one another. The detector 150 employs the FDM approach as noted in connection with FIG. 3.

The plurality of oscillators 72 is voltage controlled via a voltage source 166. It is contemplated that different types of oscillators may be used instead of a voltage-controlled oscillator. For example, such oscillators may be coupled to a mechanical resonator (such as, but not limited to, a crystal). The type of device used to generate the oscillating signal at the unique frequency may vary based on the desired criteria of a particular implementation. A plurality of resistors 155 is positioned between the oscillators 152 and the voltage source 166 to adjust the voltage output of the voltage source. The resistance value for each resistor 155 may be selected to ensure such that a different voltage input is provided to each oscillator 152. Such a condition may ensure that the oscillators 152 generate a unique frequency from one another in the event the oscillators 152 are voltage controlled. The oscillators 72 each generate an oscillating signal that is in the form of a sine function (e.g., sin (x, t)) or a cosine function (e.g., cos (y, t)).

Figure 7:
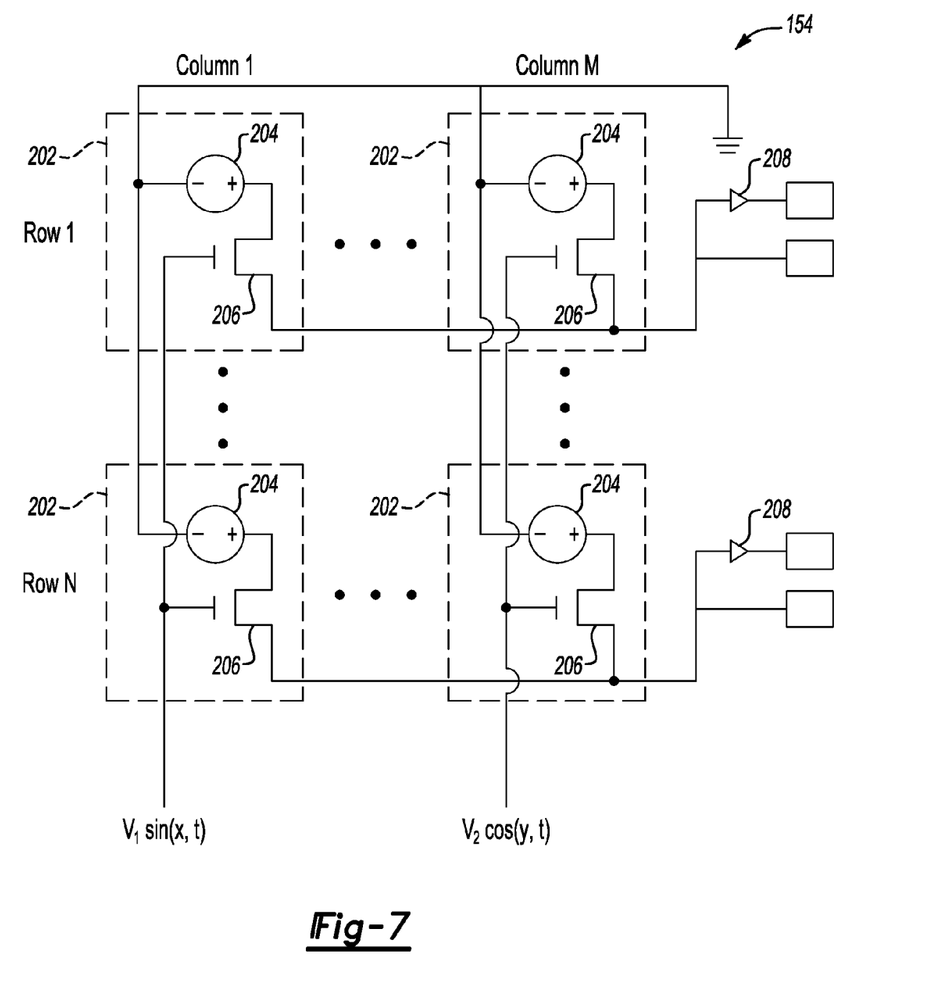
FIG. 7 depicts a thermopile array implemented within the IR detector of FIG. 6 in accordance to one embodiment of the present invention.

FIG. 7 depicts a more detailed diagram of the thermopile array 154. The array 154 includes pixels 202 (or thermal sensing elements) that are arranged in an M×N array. Each pixel 202 includes a thermopile 204 and a FET based switch 206. The number of thermopiles and switches implemented within a given pixel may vary based on the desired criteria of a particular implementation. All of the oscillators 152 are active all of the time such that all of the columns of pixels are amplitude modulated with a unique frequency. For example, the thermopiles 204 in column 1 are driven by a first oscillating signal at a first frequency and the thermopiles 204 in column M are driven by a second oscillating signal at a second frequency, where first frequency is different from the second frequency. In one example, the first frequency may be 30 Hz and the second frequency may be 60 Hz. The particular frequency used for each column is generally defined by:

$$f(i)=i*30 \text{ Hz}, \qquad (11)$$

where i corresponds to the column number.

It is recognized that metal film bolometers (or low resistance bolometers) may be implemented instead of the thermopiles with the FDM approach.

As noted in connection with FIGS. 3 and 5, each oscillator 152 is generally configured to activate all of the thermopiles for a corresponding column (or row) with an amplitude modulated orthogonal carrier at a unique frequency so that all of the thermopiles in such a column (or row) are on for the entire frame time. This may be performed for all columns within the array 154. As such, it can be said that all of the thermopiles within the array 154 are active at the same time.

An amplifier 208 may increase the voltage output for each row. The multiplexer circuit 158 transmits each voltage output from a row on a single line to the A/D converter 160. The A/D converter 160 converts the voltage output into a digital based output. The A/D converter 160 may include any combination of hardware and software to perform the conversion. A memory circuit 162 stores the digitalized output to enable transfer to the demodulation circuit 164. In one example, the memory circuit 162 may be implemented as a Direct Memory Access (DMA) storage device or other suitable storage mechanism. The demodulation circuit 164 performs a Fast Fourier Transform (FFT) on the digitized output. The demodulation circuit 164 may include any combination of hardware and software to perform the FFT. An image result depicting the captured image is generated therefrom.

It is recognized that thermopile based arrays within the detectors 70 and 150 (or other suitable variants thereof) may exhibit increased levels of thermal stability and thus may be easy to maintain radiometric calibration over a wide range of ambient temperatures. It is also recognized that thermopile based arrays within the detectors 70 and 150 (or other suitable variants thereof) that utilize the FDM approach may be adaptable for a range of capabilities such as, but not limited to, fire fighting applications as such an array may not require special image processing techniques (e.g., combining higher noise low gain images with lower noise high gain images) to display images with both hot and cold objects in the capture image. It is also recognized that thermopile based arrays within the detectors 70 and 150 (or other suitable variants thereof) may respond linearly to incoming radiance from an object. Due to such a linear response, a low cost in-factory radiometric calibration may be achieved. It is also recognized that thermopile output based signals from the thermopiles within the detectors 70 and 150 (or other suitable variants thereof) are generally differential and unbiased and may not exhibit large drift offsets. As such, radiometric calibration may be easier to maintain over a wide range of ambient temperature. It is also recognized that that the detectors 70 and 150 (or other suitable variants thereof) may not exhibit 1/f noise due to the FDM approach, which nearly eliminates the 1/f noise from the amplifier by modulating the output of the thermopile at a high enough frequency where the 1/f noise of the amplifier is negligible. It is also recognized that the detectors 70 and 150 (or other suitable variants thereof) may be able to capture, but not limited to, short temporal events because all of the thermopiles within the array may be capturing energy all of the time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An infrared (IR) detector for generating an image of an object, the IR detector comprising:
   at least one thermal sensing element being configured to:
      receive at least one oscillating signal;
      detect at least a portion of a thermal output from the object;
      generate an electrical output signal that is indicative of at least a portion of the detected thermal output; and
      modulate the electrical output signal with the at least one oscillating signal to provide a modulated output signal that is indicative of at least a portion of the image of the object;
   a gain circuit being operatively coupled to the at least one thermal sensing element and being configured to increase the modulated output signal to generate an increased modulated output signal;
   a converter being operatively coupled to the gain circuit and being configured to convert the increased modulated output signal into a digital increased modulated output signal; and
   a demodulation circuit being operatively coupled to the converter and being configured to demodulate the digital increased modulated output signal for providing at least a portion of the image of the object.

2. The IR detector of claim 1 wherein the at least one thermal sensing element includes:
 a thermopile being configured to detect the at least a portion of the thermal output from the object;
 at least one first switch being operatively coupled to the thermopile and being configured to receive the at least one oscillating signal for modulating the electrical output with the at least one oscillating signal; and
 at least one second switch being operatively coupled to the thermopile and being configured to enable the at least one thermal sensing device to provide an electrical output therefrom in the event the thermopile is damaged.

3. The IR detector of claim 2 wherein the thermopile is formed with $(Bi_{1-x}Sb_x)_2(Te_{1-y}Se_y)_3$, wherein x and y are each one of an integer and a non-integer.

4. The IR detector of claim 1 wherein the at least one thermal sensing element includes a first thermal sensing device and a second thermal sensing device that are coupled in series with one another.

5. The IR detector of claim 4 wherein the gain circuit includes an amplifier that is connected in series with the first thermal sensing device and the second thermal sensing device for receiving the modulated output signal from each of the first thermal sensing device and the second thermal sensing device.

6. The IR detector of claim 1 wherein the at least one oscillating signal comprises at least one Walsh function.

7. The IR detector of claim 1 wherein the demodulation circuit comprises one of a Fast Walsh Transform, a Fast Fourier Transform and a matched filter.

8. An infrared (IR) detector for generating an image of an object, the IR detector comprising:
 a plurality of thermal sensing elements being arranged in one of a column and a row, each of the thermal sensing elements including:
  a thermopile being configured to detect at least a portion of a thermal output from the object and to generate an electrical output signal indicative of at least a portion of the detected thermal output;
  at least one first switch being operatively coupled to the thermopile and being configured to receive at least one oscillating signal to modulate the electrical output signal of the thermopile for generating a modulated output signal; and
  a second switch being operatively coupled to the thermopile and being configured to provide an electrical path such that the thermal sensing device is capable of providing an electrical output therefrom in the event the thermopile is damaged.

9. The IR detector of claim 8 wherein the plurality of thermal sensing devices are arranged in series in the one of the columns and the rows.

10. The IR detector of claim 9 wherein the second switch is configured to provide the electrical path for a particular thermal sensing device from the plurality of thermal sensing devices such that any remaining thermal sensing devices from the plurality of thermal sensing devices, while arranged in series with the particular thermal sensing device, are each capable of providing the modulated output signal.

11. The IR detector of claim 9 further comprising an amplifier being arranged in series with the plurality of thermal sensing devices to receive and to increase the modulated electrical output from at least one of the plurality of thermal sensing devices.

12. The IR detector of claim 8 further comprising a gain circuit being operatively coupled to the each thermopile to receive the modulated output signal from each thermopile and to provide an increased modulated output signal from each thermopile.

13. The IR detector of claim 12 further comprising an analog to digital (A/D) converter being operatively coupled to the gain circuit to convert each increased modulated output signal into a digital increased modulated output signal.

14. The IR detector of claim 13 further comprising a demodulation circuit being operatively coupled to the A/D converter and being configured to demodulate each digital increased modulated output signal for providing at least a portion of the image of the object.

15. An infrared (IR) detector for generating an image of an object, the IR detector comprising:
 at least one thermal sensing element including:
  a thermopile being configured to transmit an electrical output signal indicative of at least a portion of a detected thermal output; and
  at least one first switch being operatively coupled to the thermopile and being configured to receive at least one oscillating signal for modulating the electrical output with the at least one oscillating signal;
 a gain circuit being operatively coupled to the at least one thermal sensing element and being configured to increase the modulated output signal to generate an increased modulated output signal;
 a converter being operatively coupled to the gain circuit and being configured to convert the increased modulated output signal into a digital increased modulated output signal; and
 a demodulation circuit being operatively coupled to the converter and being configured to demodulate the digital increased modulated output signal for providing at least a portion of the image of the object.

16. The IR detector of claim 15 wherein the at least one thermal sensing device further includes at least one second switch being operatively coupled to the thermopile and being configured to enable the at least one thermal sensing device to provide an electrical output therefrom in the event the thermopile is damaged.

17. The IR detector of claim 15 wherein the thermopile is formed with $(Bi_{1-x}Sb_x)_2(Te_{1-y}Se_y)_3$, wherein x and y are each one of an integer and a non-integer.

18. The IR detector of claim 15 wherein the at least one thermal sensing device includes a first thermal sensing device and a second thermal sensing device that are coupled in series with one another.

19. The IR detector of claim 18 wherein the gain circuit includes an amplifier that is connected in series with the first thermal sensing device and the second thermal sensing device for receiving the modulated output signal from each of the first thermal sensing device and the second thermal sensing device.

20. The IR detector of claim 15 wherein the demodulation circuit comprises one of a Fast Walsh Transform, a Fast Fourier Transform and a matched filter.

* * * * *

UNITED STATES PATENT AND TRADEMARK OFFICE
CERTIFICATE OF CORRECTION

Page 1 of 3

PATENT NO. : 8,158,943 B2
APPLICATION NO. : 13/263825
DATED : April 17, 2012
INVENTOR(S) : David Kryskowski and Justin Renken It is certified that error appears in the above-identified patent and that said Letters Patent is hereby corrected as shown below:

In the Specification:

Column 3, Line 48:
After "capacitor" delete "42" and insert -- 32 --.

Column 3, Line 52:
After "capacitor" delete "42" and insert -- 32 --.

Column 7, Line 25, Equation 5:
Delete "$n_e(t)$" and insert -- $n_e'(t)$ --.

Column 10, Line 14:
After "gain circuit" delete "80" and insert -- 78 --.

In the Claims:

Column 13, Line 20, Claim 4:
After "first thermal sensing" delete "device" and insert -- element --.

Column 13, Line 20, Claim 4:
After "second thermal sensing" delete "device" and insert -- element --.

Column 13, Line 24, Claim 5:
After "first thermal sensing" delete "device" and insert -- element --.

Column 13, Line 24, Claim 5:
After "second thermal sensing" delete "device" and insert -- element --.

Signed and Sealed this
Thirty-first Day of March, 2015

Michelle K. Lee
*Director of the United States Patent and Trademark Office*

CERTIFICATE OF CORRECTION (continued)
U.S. Pat. No. 8,158,943 B2

Column 13, Line 26, Claim 5:
After "first thermal sensing" delete "device" and insert -- element --.

Column 13, Line 27, Claim 5:
After "second thermal sensing" delete "device" and insert -- element --.

Column 13, Line 53, Claim 9:
After "thermal sensing" delete "devices" and insert -- elements --.

Column 13, Line 57, Claim 10:
After "thermal sensing" delete "device" and insert -- element --.

Column 13, Line 58, Claim 10:
After "thermal sensing" delete "devices" and insert -- elements --.

Column 13, Line 58, Claim 10:
After "thermal sensing" delete "devices" and insert -- elements --.

Column 13, Line 59, Claim 10:
After "thermal sensing" delete "devices" and insert -- elements --.

Column 13, Line 60, Claim 10:
After "thermal sensing" delete "device" and insert -- element --.

Column 14, Line 1, Claim 11:
After "sensing" delete "devices" and insert -- elements --.

Column 14, Line 2, Claim 11:
After "modulated" delete "electrical" and after "output" insert -- signal --.

Column 14, Line 3, Claim 11:
After "sensing" delete "devices" and insert -- elements --.

Column 14, Line 41, Claim 16:
After "thermal sensing" delete "device" and insert -- element --.

Column 14, Line 43, Claim 16:
After "thermal sensing" delete "device" and insert -- element --.

Column 14, Line 50, Claim 18:
After "thermal sensing" delete "device" and insert -- element --.

Column 14, Line 50, Claim 18:
After "thermal sensing" delete "device" and insert -- element --.

Column 14, Line 51, Claim 18:
After "thermal sensing" delete "device" and insert -- element --.

Column 14, Line 55, Claim 19:
After "first thermal sensing" delete "device" and insert -- element --.

Column 14, Line 55, Claim 19:
After "second thermal sensing" delete "device" and insert -- element --.

Column 14, Line 57, Claim 19:
After "first thermal sensing" delete "device" and insert -- element --.

Column 14, Line 58, Claim 19:
After "second thermal sensing" delete "device" and insert -- element --.